US011472519B2

(12) United States Patent
Sirnivas et al.

(10) Patent No.: US 11,472,519 B2
(45) Date of Patent: Oct. 18, 2022

(54) FLEXIBLE AQUATIC SUBSTRUCTURES

(71) Applicant: Alliance for Sustainable Energy, LLC, Golden, CO (US)

(72) Inventors: Senu Sirnivas, Broomfield, CO (US); Rick Riccardo Damiani, Arvada, CO (US); Fabian Ferdinand Wendt, Boulder, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 131 days.

(21) Appl. No.: 16/966,251

(22) PCT Filed: Jan. 30, 2019

(86) PCT No.: PCT/US2019/015783
§ 371 (c)(1),
(2) Date: Jul. 30, 2020

(87) PCT Pub. No.: WO2019/152477
PCT Pub. Date: Aug. 8, 2019

(65) Prior Publication Data
US 2021/0039755 A1    Feb. 11, 2021

Related U.S. Application Data

(60) Provisional application No. 62/623,805, filed on Jan. 30, 2018.

(51) Int. Cl.
*B63B 35/44* (2006.01)
*F03D 13/25* (2016.01)
(Continued)

(52) U.S. Cl.
CPC .............. *B63B 35/44* (2013.01); *B63B 1/107* (2013.01); *B63B 1/14* (2013.01); *B63B 21/50* (2013.01);
(Continued)

(58) Field of Classification Search
CPC ........... B63B 35/44; B63B 1/107; B63B 1/14; B63B 21/50; B63B 2001/145;
(Continued)

(56) References Cited

U.S. PATENT DOCUMENTS

2008/0014025 A1  1/2008  They
2010/0150664 A1  6/2010  Jakubowski
(Continued)

FOREIGN PATENT DOCUMENTS

WO  WO-2006037828 A1 *  4/2006  ............. F03D 13/25
WO  2013/083358 A1  6/2013

OTHER PUBLICATIONS

International Search Report and Written Opinion for International Application (PCT) No. 2019/152477, dated Apr. 15, 2019, pp. 1-10.

Primary Examiner — Mickey H France
(74) Attorney, Agent, or Firm — Alexandra M. Hall

(57) ABSTRACT

Disclosed herein are aquatic substructures capable of supporting a weight such as a wind tower and turbine. The aquatic substructures may include a central column and at least one buoyancy container connected by means of a system of cables and beams as described herein.

8 Claims, 7 Drawing Sheets

(51) Int. Cl.
  *B63B 1/10*   (2006.01)
  *B63B 21/50*  (2006.01)
  *B63B 1/14*   (2006.01)
  *F03B 13/18*  (2006.01)

(52) U.S. Cl.
  CPC ........ *F03D 13/25* (2016.05); *B63B 2001/145* (2013.01); *B63B 2035/446* (2013.01); *F03B 13/182* (2013.01); *F03B 13/1815* (2013.01); *F05B 2240/93* (2013.01); *Y02E 10/727* (2013.01)

(58) Field of Classification Search
  CPC ............... B63B 2035/446; F03D 13/25; F05B 2240/93; Y02E 10/727; Y02E 10/72; F03B 13/1815; F03B 13/182
  See application file for complete search history.

(56) References Cited

U.S. PATENT DOCUMENTS

2013/0019792 A1\* 1/2013 Jahnig ..................... B63B 3/04
                                                        114/267
2017/0190391 A1   7/2017 Siegfriedsen \* cited by examiner

FLEXIBLE AQUATIC SUBSTRUCTURES

CROSS-REFERENCE TO RELATED APPLICATIONS

This application is a national stage entry of International Application No. PCT/US19/15783 filed on Jan. 30, 2019 and claims the benefit of U.S. Provisional Application No. 62/623,805 filed on Jan. 30, 2018. The contents of each application listed above are incorporated herein by reference in their entirety.

CONTRACTUAL ORIGIN

The United States Government has rights in this invention under Contract No. DE-AC36-08GO28308 between the United States Department of Energy and Alliance for Sustainable Energy, LLC, the Manager and Operator of the National Renewable Energy Laboratory.

BACKGROUND

The offshore wind industry has struggled due to the high technical risk of the process of operating offshore wind turbines. Innovative floating wind systems are needed to lower the levelized cost of electricity (LCOE). The LCOE is the net present value of the unit-cost of electricity over the lifetime of a generating structure, such as an offshore wind turbine.

Currently utility-scale floating wind systems are based on traditional oil and gas technology and reliability criteria that have resulted in bulky and expensive designs. The substructure and installation of an offshore wind turbine may account for up to 40% of the total cost of the turbine. Therefore, there is ample room to lower the substructure and installation costs.

The foregoing examples of the related art and limitations therewith are intended to be illustrative and not exclusive. Other limitations of the related art will become apparent to those of skill in the art upon a reading of the specification and a study of the drawings.

SUMMARY

An aspect of the present disclosure is a device including a column having a first end and a second end, a first container, a first beam having a third end and a fourth end, a first joint that connects the third end of the first beam to the column, a second joint that connects the fourth end of the first beam to the first container, a first cable that connects the second joint to the first end of the column, and a second cable that connects the second joint to the second end of the column. In some embodiments, the first joint is a universal joint, a ball joint, or spherical rolling joint. In some embodiments, the second joint is a universal joint, a ball joint, or a spherical rolling joint. In some embodiments, the device also includes a ballast that is connected to at least one of the column or the first container. In some embodiments, the first container is a tank containing at least one of oxygen or nitrogen. In some embodiments, the first cable and the second cable are fiberglass rope, metal chain links, or steel cables.

In some embodiments of the present disclosure, the container is a first container, and the device further includes a second container, a second beam having a fifth end and a sixth end, a third joint that connects the fifth end of the second beam to the column, a fourth joint that connects the sixth end of the second beam to the second container, a third cable that connects the fourth joint to the first end of the column, and a fourth cable that connects the fourth joint to the second end of the column, wherein the second container and first container are substantially within a plane. In some embodiments, the third joint is a universal joint, a ball joint, or spherical rolling joint. In some embodiments, the fourth joint is a universal joint, a ball joint, or a spherical rolling joint. In some embodiments, the device further comprises a ballast that is connected to at least one of the column, the first container, or the second container. In some embodiments, the first container and the second container are tanks containing at least one of oxygen or nitrogen.

Another aspect of the present disclosure includes a method that includes connecting a first beam to a column at a substantially right angle using a first joint, connecting the first beam to a first container using a second joint, and supplying compression to the first beam by connecting a first cable and a second cable to the second joint and the column, wherein the column has a first end and a second end, the first cable connects the second joint to the first end of the column, the second cable connects the second joint to the second end of the column, and the first cable and the second cable are under tension. In some embodiments, the first joint and the second joint are universal joints, ball joints, or spherical rolling joints. In some embodiments, the method further includes anchoring the aquatic subsystem in place using mooring chains attached to at least one of the column or the first container. In some embodiments, the method further includes lowering a ballast attached to at least one of the column or the first container. In some embodiments, the method further includes raising the ballast to allow the aquatic substructure to be moved by means of a wet tow.

Another aspect of the present disclosure is a device that includes a column having a first end, a second end, and a length, a buoyancy container, a beam having a third end and a fourth end that is at an approximately right angle to the column, a first cable that is attached to the second joint and the first end of the column, a second cable that is attached to the second joint and the second end of the central column, a first joint that connects the third end of the beam to the length of the central column, and a second joint that connects the fourth end of the beam to the buoyancy container; wherein the cables are under tension. In some embodiments, the device further includes a ballast that is connected to at least one of the column or the buoyancy container, a chain that connects the ballast to at least one of the column or the buoyancy container, and a mooring line that connects at least one of the column or the buoyancy container to the ocean floor. In some embodiments, the first joint and the second joint are universal joints, ball joints, or spherical rolling joints.

Another aspect of the present disclosure is a device that includes a column having a first end, a second end, and a length, a buoyancy container, a beam having a third end connected to the length of the central column and a fourth end, a first cable that connects the first joint to the first end of the column, a second cable that connects the first joint to the second end of the column, a first joint that connects the fourth end of the beam to the buoyancy container, and the beam is oriented at an approximately right angle to the central column; wherein the cables are under tension. In some embodiments, the third end of the beam is connected to the length of the central column by a second joint. In some embodiments, the first cable and the second cable comprise one length of cable.

BRIEF DESCRIPTION OF THE DRAWINGS

Exemplary embodiments are illustrated in referenced figures of the drawings. It is intended that the embodiments and figures disclosed herein are illustrative rather than limiting.

DETAILED DESCRIPTION

In one aspect, the present disclosure describes an aquatic substructure designed to support a weight situated on top of a column by connecting the column to at least two buoyancy containers using beams and cables. The cables may exert a force on each beam such that each beam may be under tension and may be compressed. The tension of the cables and compression of the beams allows the force of the weight to be distributed throughout the aquatic substructure. At the distal end of each beam may be a buoyancy container (such as a container, cistern, tank, or combination thereof) which may be connected to the beam by means of a joint. The joint may allow for a reduction in the loading force on the beam and may allow the buoyancy container to rotate free of the rest of the aquatic substructure. The joint may create a moment-free connection between the beam and the buoyancy device.

Figure 1:
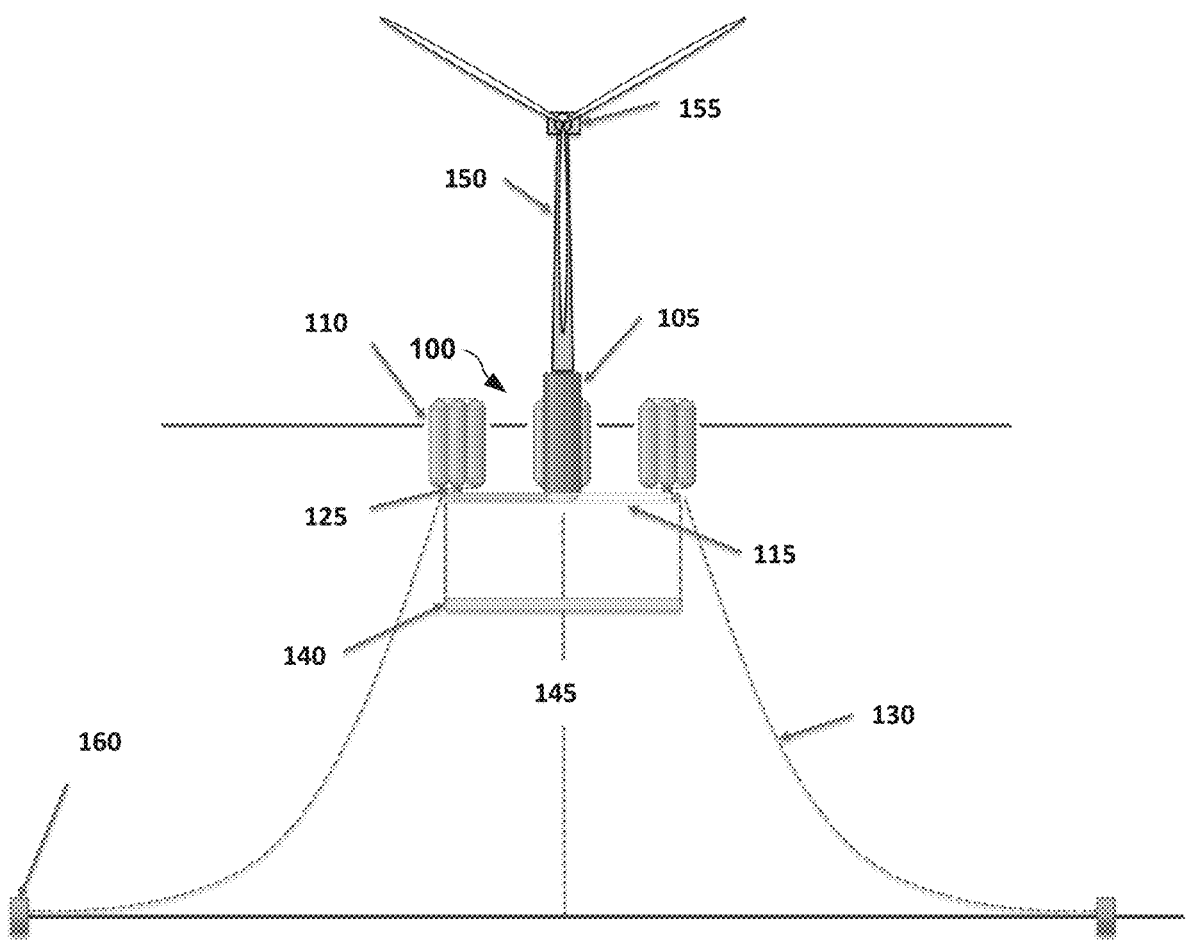
FIG. 1 illustrates a wind tower and turbine supported by one embodiment of an aquatic substructure as described in some aspects of the present disclosure.

FIG. 1 illustrates a wind tower and turbine supported by an aquatic substructure 100 as described in some embodiments of the present disclosure. As shown in FIG. 1, aquatic substructure 100 includes a column 105, buoyancy containers 110, a base 115, joints 125, a ballast 140, lowering chain 145, and mooring lines 130. For brevity, not all of the buoyancy containers 110, joints 125, lowering chain 145, and mooring lines 130 are labeled in FIG. 1. In the embodiment of FIG. 1, substructure 100 supports a turbine 155 and a tower 150. In other embodiments, substructure 100 may support various other structures or additional towers.

In the embodiment of FIG. 1, turbine 155 may capture and convert offshore wind to useable energy. The specifics of substructure 100 shown in FIG. 1, are based on using "material for purpose" and load reduction of its members (i.e., the beams). The embodiment shown in FIG. 1 may represent an "installed" or active configuration of substructure 100, meaning the aquatic substructure is in its desired location for operation of the turbine 155. The ballast 140 may be lowered, thereby lowering the center of gravity of aquatic substructure 100, when the aquatic substructure is in its desired location for the operation of the turbine 155.

In the embodiment of FIG. 1, the buoyancy containers 110 may include multiple tanks which are connected in three groupings to form three buoyancy containers 110. The three groupings of tanks may be deemed three buoyancy containers 110 for aquatic substructure 100. The tanks may be sized as needed to support the weight of the tower 150 and turbine 155. The number of tanks in each grouping may depend on the size and weight of tower 150 and turbine 155. In some embodiments, a buoyancy container 110 may be made of up of a single tank. In other embodiments, a buoyancy container 110 may be made up of two or more tanks.

Figure 2:
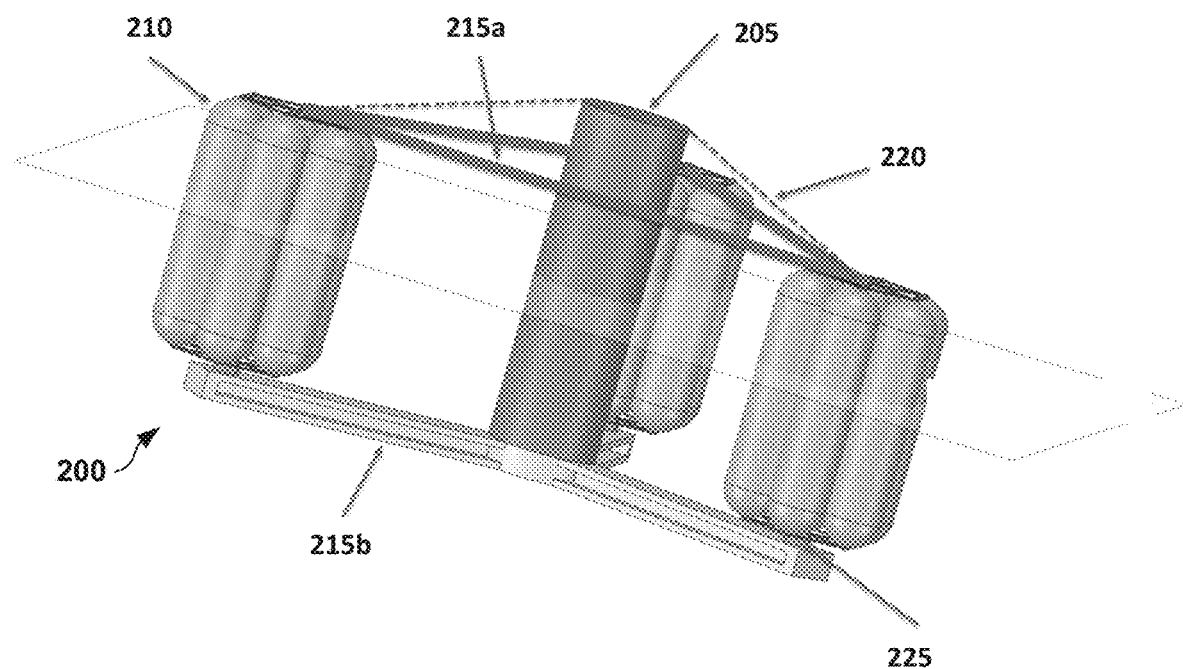
FIG. 2 illustrates another embodiment of an aquatic substructure as described in some embodiments of the present disclosure.

FIG. 2 illustrates another embodiment of an aquatic substructure 200, in accordance with one or more aspects of the present disclosure. As shown in FIG. 2, substructure 200 includes a column 205, buoyancy containers 210, cables 220, joint 225, beams 215a, and base 215b. For brevity, not all of the buoyancy containers 210, cables 220, joints 225, or beams 215a are labeled in FIG. 2. Column 205, buoyancy containers 210, base 215b, and joints 225, as shown in FIG. 2, may be substantially the same as column 105, buoyancy containers 110, base 115, and joints 125 described with respect to FIG. 1.

The configuration shown in the embodiment of FIG. 2 also includes cables 220 and beams 215a. The connection cables 220 and beams 15a2 may restrain the movement of the buoyancy containers 210 to keep the buoyancy containers 210 from being undesirably agitated by waves or current. While shown in FIG. 2 as including both base 215b and beams 215a, the aquatic substructure 200 may, in some examples, include only the beams 215a. In other words, the beams 215a may be used in place of the base 215b or in addition to the connection cables 220.

Figure 3:
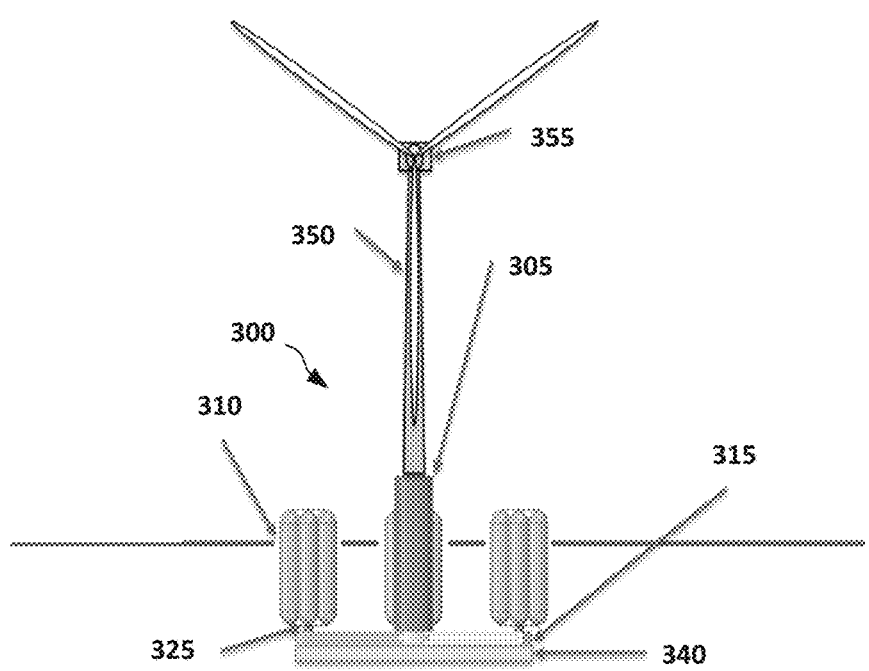
FIG. 3 illustrates a wind tower and turbine supported by another embodiment of an aquatic substructure as described in some embodiments of the present disclosure.

FIG. 3 illustrates a wind tower and turbine supported by another embodiment of an aquatic substructure as described in some embodiments of the present disclosure FIG. 3 is a conceptual diagram illustrating another embodiment of an aquatic substructure 300, in accordance with one or more aspects of the present disclosure. Aquatic substructure 300, as shown in FIG. 3, may be substantially similar to substructure 100 of FIG. 1 or substructure 200 of FIG. 2. As shown in FIG. 3, aquatic substructure 300 includes column 305, tower 350, turbine 355, buoyancy containers 310, joints 325, base 315, and ballast 340. Column 305, tower 350, turbine 355, buoyancy containers 310, joints 325, base 315, and ballast 340 may be substantially the same as column 105, tower 150, turbine 155, buoyancy containers 110, joints 125, base 115, and ballast 140 described with respect to FIG. 1. The embodiment as shown in FIG. 3 may represent a "transport" configuration of substructure 300. For example, as shown in FIG. 3, the ballast 340 may be retracted. This may result in substructure 300 having a lower draft (i.e., the mean water line), which can be beneficial during wet tow, such as from a port of fabrication and assembly to an install site.

One purpose of the floating wind turbine substructures depicted in the examples of FIGS. 1-7 is to provide buoyancy and restoring force to stabilize and support the attached structure (e.g., turbine and tower), and the mass of the mooring system. The orientation and structure of the aquatic substructures as described in FIGS. 1-7 and some other embodiments disclosed herein allow for a moment-free connection between the buoyancy containers and the column, which may reduce the bending load on the beams. This may result in a more flexible support structure for offshore wind energy or other purposes.

The use of "material for purpose" (i.e., using lightweight components to provide buoyancy and heavyweight components for ballast)—may allow the substructures to achieve stability requirements necessary for supporting the attached structures. For instance, the substructures shown in FIGS. 1-7 may limit the heel angle and tower top accelerations to within the margins defined by a wind turbine manufacturer (e.g., smaller than 10 degrees and 0.3 g, or similar margins). In other words, the aquatic substructures as described herein may increase the stability of the support provided to any weight or structure they are supporting.

The buoyancy of aquatic substructures as described herein may generally be provided by the column and the buoyancy containers. The column may be a hollow tank, container, column, or cistern, made of steel or concrete, to support the transfer of loads from the tower and turbine. Because column may be hollow, it provides some buoyancy for the substructure. In other embodiments, the column may be dense or not hollow. The outer buoyancy containers may be columns, containers, cisterns, or tanks made of fiberglass or other lightweight material to provide additional buoyancy. The outer buoyancy containers may also be hollow or filled with a lightweight filler such as air, nitrogen, or foam material. The column and outer buoyancy containers may be a single object or may be a collection of multiple objects together. That is, while shown in FIGS. 1-7, as a single object (for the column) and multiple objects (for the buoyancy containers), respectively, the central column and buoyancy containers may, in various examples, each be a single object or multiple objects. As used herein, the term column may be a container or object having a circular cross section, rectangular cross section, or polygon cross section.

In FIGS. 1 and 3, the base 115 or 315 and the retractable ballast 140 or 340 may be formed of concrete or other dense material, to lower the substructure's center of gravity. The retractable ballast may be in the same shape as the base, or the two may be different shapes. In some embodiments the ballast may be a container filled with a dense material such as water, sand, or concrete.

In some embodiments, the base 115 or 315 may be a platform or slab of heavy concrete used at the bottom of the column 105 or 305 to lower the center of gravity of the substructure. It may be concrete, asphalt, fiberglass, aluminum, steel, or another solid material. In other embodiments of the present disclosure, the function provided by the base (i.e., supporting the system and providing stability) may be provided by beams as described herein.

To reduce the loads on the base, universal joints may be used for a moment-free connection between the base and the buoyancy containers by attaching universal joints to opposite ends of a beam connecting the column to the buoyancy containers. This may allow for a more lightweight design. That is, since the buoyancy containers are allowed to move within the limitations of the universal joints, hydrodynamic wave loads applied on the buoyancy containers will be transferred into motion of the buoyancy containers rather than to the column. This may reduce the loads transferred from the buoyancy containers on to the base and column, which may allow for lighter materials, as they do not need to withstand such loads. The ability of the buoyancy containers to move may also help to reduce the motion of the attached structure (e.g., a turbine and tower for offshore wind energy generation or another purpose) by reducing the wave-induced hydrodynamic excitation of the substructure. This may make the aquatic substructure more stable as a support for the attached structure.

As shown in the example of FIG. 3, the retractable ballast 340 may be retracted during transport to improve shallow water clearance (e.g., at the port of fabrication and assembly). Raising the ballast 340 may also raise the center of gravity of the aquatic substructure 300, making it easier to be relocated. The retracting may be done by pulling the ballast 340 up to be in direct contact with the base 5. Once at an installation site, the substructure (e.g., elements 305, 310, 315, 320, and 325), and/or the structure (e.g., the tower 350 and turbine 355) may be connected to a catenary mooring system (e.g., elements 130 and 145 shown in FIG. 1). Furthermore, the retractable ballast 340 may be lowered via the ballast lowering chain 145 to further lower the center of mass for operational stability when the aquatic substructure has reached the desired installation location.

In some examples, the mooring system may be pre-installed. The mooring system may include mooring chains 130 and anchors 160. The anchors 160 may be of a drag embedment type, a suction pile type, or other suitable type. The anchors 160 may attach the aquatic substructure 100 to the sea floor, a mooring device (such as a dock or permanent anchor), or another aquatic substructure. In some examples, the mooring system may be easily detachable, allowing a wet tow of the substructure, and aquatic structure back to port for maintenance and/or end of lifecycle dismantling or repurposing of the unit.

The embodiment as shown in FIG. 2 depicts two optional components for connecting the outer buoyancy containers 210 to one another and/or to the column 205. In the example of FIG. 2, connection cables 220 and/or beams 215 may be used to restrain the outer buoyancy containers 210, thereby preventing excessive movement (e.g., in rough waters). The cables could be steel wire rope, composite fiber rope, chains, or other suitable material. The cables may be under tension.

Figure 4A:
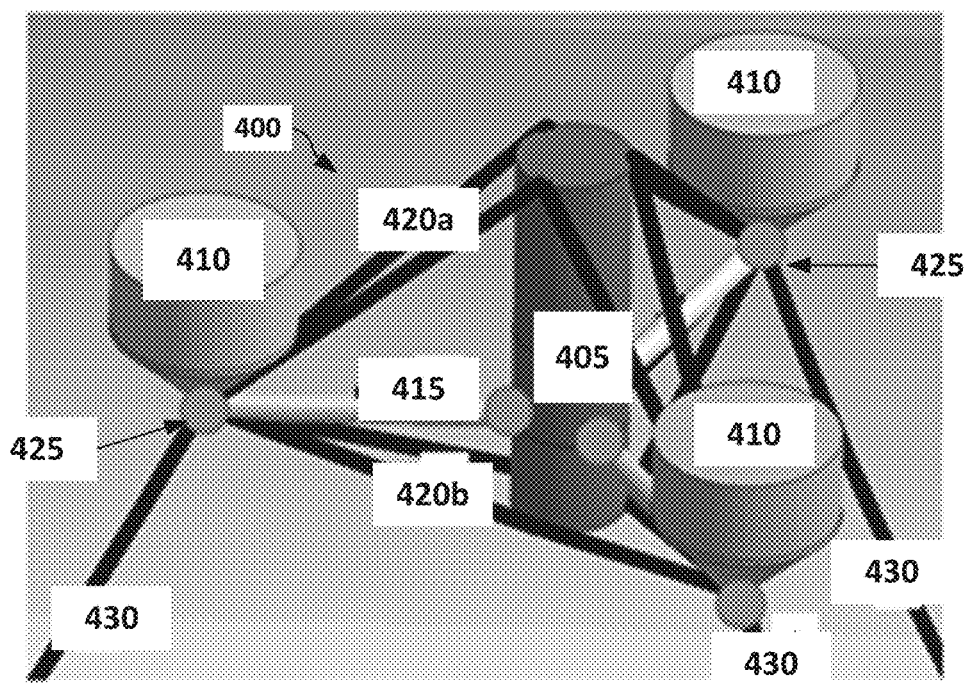
FIGS. 4A and 4B illustrate another embodiment of an aquatic substructure as described in some embodiments of the present disclosure.
Figure 4B:
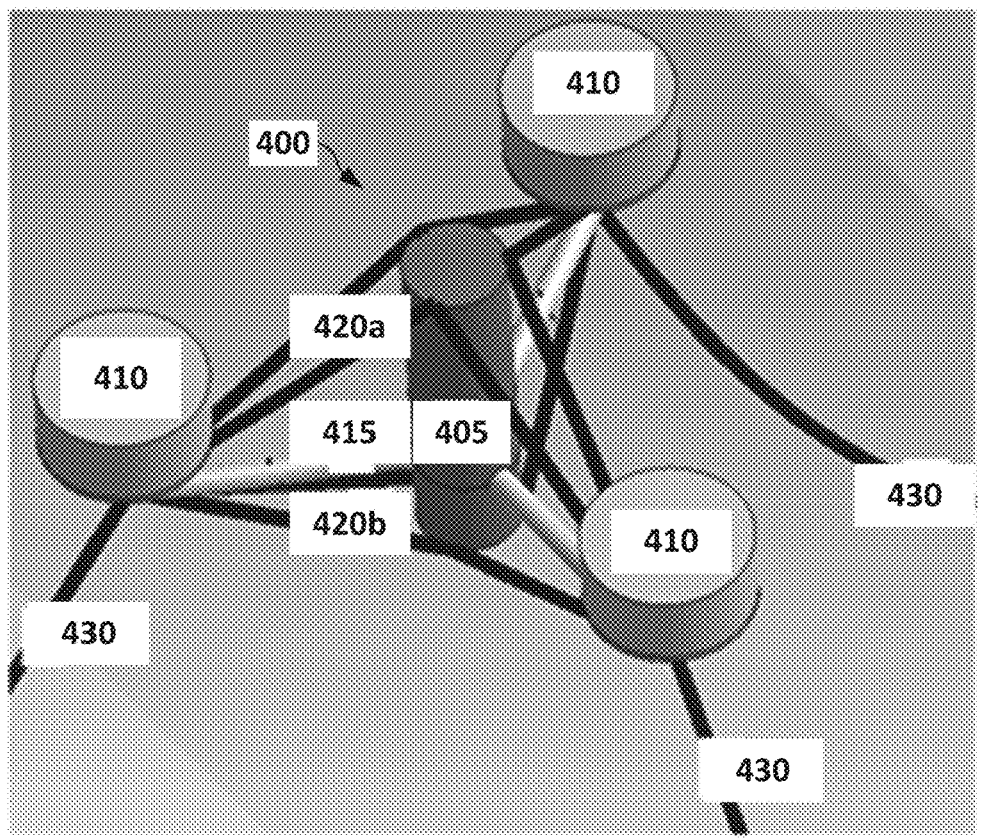

FIGS. 4A and 4B illustrate another embodiment of an aquatic substructure as described in some embodiments of the present disclosure. In the examples of FIGS. 4A and 4B, substructure 400 may be configured to support a wind turbine to capture and convert offshore wind to useable energy. Substructure 400 may include mooring chains 430, upper support cables 420a, lower support cables 420b, beams 415, a column 405, and buoyancy containers 410. For brevity, not all of the upper support cables 420a, the lower support cables 420b, the beams 415, or the buoyancy containers 410 are labelled in FIGS. 4A and 4B. Substructure 400 are shown in the examples of FIGS. 4A and 4B with a connected mooring system (e.g., mooring lines 430). In FIG. 4A, the dots represent joints 425, which may be located on either end of each of the beams 415. The joints may be universal joints, or any joint which allows for a moment free connection. Again, for brevity, not all universal joints are highlighted with dots in FIGS. 4A and 4B, but such additional universal joints may be discerned through symmetry of substructure 400.

One of the aspects that sets substructure 400 apart from related art substructures is its utilization of cables, universal joints, and radial beams, resulting in a light weight, load path optimized design. That is, while some floating structures may use large beams that guide buoyancy- and gravity-related loads through the substructure, the design depicted in FIGS. 4A and 4B avoid the costly transfer of loads through bending moments. Instead, as shown in FIGS. 4A and 4B, the internal loads may be routed through a combination of cables (e.g., wire rope, composite fiber ropes, chains, or other suitable means) and beams to obviate cost-intensive and heavy bending-resisting beam. The combination of cables, universal joints, and beams also introduces additional compliance/flexibility to the substructure, which means some of the wave-induced loads applied to the substructure may cause motion of the substructure members within the limitations of the universal joints. This may help to reduce the wave-induced motion of attached structures (e.g. wind turbines, etc.). The beams may also be compressive members.

The cables being under tension may place a force on the beam which may cause it to be compressed or to bear a load. The joint at the distal end of the beam may allow In some embodiments, the column may be located at the bottom of the tower. The column may central to the buoyancy containers or may be in another orientation. The column may be comprised of a solid material such as concrete, fiberglass, plastic, steel, aluminum, or another metal. In some embodiments, the column may be hollow. The column may be used to support the transfer of the loads for a tower and turbine, if present. In some embodiments, the column may be the center around which the buoyancy containers are oriented. In other embodiments, the column may be in line (i.e., substantially within a plane) with one or more buoyancy containers. In some embodiments, there may be multiple columns either positioned together or arranged in a triangular or polygonal shape.

In some embodiments, the buoyancy containers may be used to create most of the needed buoyancy by the aquatic substructure. The buoyancy containers may be tanks, cans, cisterns, or containers made of fiberglass, plastic, or another solid material. The buoyancy containers may be substantially cylindrical, spherical, canonical, or rectangular. The buoyancy containers may have a smaller radius at one end of the container than at the other; that is, the buoyancy containers may be cone- or pyramid-shaped. The buoyancy containers may be filled with air, oxygen, nitrogen, or other inert gases. The buoyancy containers may be filled with foam or other lightweight materials. In some embodiments, the buoyancy containers may not be a hollow tank or reservoir, but may be a solid, flexible, and lightweight material. The buoyancy containers may be any material which floats on water.

The number of buoyancy containers used in an aquatic substructure may depend on the size of the column, weight of the tower (or other object being supported), and/or the wave conditions at the site of use. When circumstances require more buoyancy or a larger support structure, the number of buoyancy containers may be 3, 5, 10, or any other number of buoyancy containers. As used herein, the term "buoyancy container" may be comprised of multiple tanks or containers attached to each other using rope, metal wiring, chains, or other methods.

In some embodiments, the joints may be points throughout the substructure where there is a moment-free connection for a lightweight design. These joints may allow the substructure to be flexible as the substructure is jostled in waves. The joints may be universal joints, ball joints, pin joint, U joints, or other types of joints which allow for a moment-free connection of the base or beams to the buoyancy containers. In some examples, certain joints may be of one type while other joints may be of another type. The type of joint may be based on the desired motility of the joint.

In some embodiments, the joints may allow the buoyancy containers to rotate and move independent of the rest of the structure. The joints may reduce the bending load on the beams or the base by the weight of the column and tower. In some embodiments, there may be joints connecting the buoyancy containers to the base or to connect the buoyancy containers to beams. In some embodiments, there may be joints on either ends of beams (i.e., one joint connecting the beam to the column and a second joint connecting the beam to the buoyancy container).

In some embodiments, the ballast may be a concrete slab deployed using cables or chains at the installation site to lower the platform center of gravity for stability and improved performance. In some embodiments, the ballast may be a structure similar to the base or orientation of the buoyancy containers (i.e., a flat and relatively thin piece of concrete or other dense material). In other embodiments the ballast may be a large tank or container for holding water or another dense substance, with the ability to allow the dense substance to enter and exit the ballast. The ballast may be substantially rectangular or may be a polygon in the same shape as the base. In other embodiments, the ballast may be cylindrical, spherical, or cubic. In some embodiments there may be multiple ballasts connected to the column and/or the buoyancy containers.

In some embodiments, the ballast lowering chain may be a cable to lower the retractable ballast. The lowering chain may be made of metal, fiberglass, plastic, concrete, or a mixture of materials. The chain may have links which connect to form the chain or may be a continuous line. The ballast lowering chain may be connected to one or more of the column or a buoyancy container.

In some embodiments, the mooring chain may be an easily detachable system which allows for a wet tow of the substructure. A wet tow of substructure may be done to reposition the substructure, to return the substructure to quayside for maintenance or end-of-lifecycle dismantling or repurposing of the substructure. The mooring chain may attach to an anchor when the aquatic substructure is in position for use or for storage.

In some embodiments, an anchor may be used to attach the aquatic substructure to the sea floor. The anchor may be a drag embedment, pipe anchors, or may be any device capable of securing the aquatic substructure to the sea floor. The anchor and mooring chain system may be any device, or combination of devices, which allows the aquatic substructure to be held in place.

In some embodiments, the base may be replaced by a system of beams and cables. In other embodiments, the base may be used in addition to beams and cables. The beams and cables may allow for the aquatic substructure to be assembled at its site of use and may result in a decrease in construction costs. Additionally, the beams and cables may be easily replaced in a piecemeal fashion as they corrode, age, or are deteriorated by weather, salt water, and the elements. In some embodiments the cables may be under tension. The cables may connect a joint at the distal end of a beam (i.e., the end of a beam away from the column) to the column. The cables may connect the joint to the column with connection points at both the top end and lower end of the column. In some embodiments the lower connection of the cables may be underneath the mean water line. As previously stated, the cables may be replaced in a piecemeal fashion as needed which may reduce maintenance costs.

In some embodiments, the mooring chains, upper support cables, and lower support cables may be made of metal chain, fiber rope, plastic, or another connecting material. The mooring chains, upper support cables, and lower support cables, may be made with different materials or may all be made with the same materials. The upper support cables may connect the buoyancy containers with the top of the column. The lower support cables may connect the buoyancy containers with the bottom of the column. There may be a single upper support cable per buoyancy container or there may be multiple. There may be a single lower support cable per buoyancy container or there may be multiple. In embodiments where there are multiple upper or lower support cables per buoyancy container the cable may be wrapped around the column (i.e., the multiple upper or lower support cables may be made of a single connected cable). Cables may be attached to the column by means of a shackle, a ring, or another securing mechanism embedded or welded to the column. Each cable may have a turnbuckle, stretching screw, or bottle screw to adjust the tension and length of the cable.

In some embodiments, the buoyancy containers may be made of a combination of multiple tanks or may be a single container at each location. The containers may be substantially hollow or may be filled with a gas or a lightweight material. The gas may be substantially oxygen, nitrogen, helium, or any combination thereof. The gas may be inert. The lightweight material may be foam, cork, or pellets. In some embodiments the buoyancy containers may be a sold material that is lightweight, such as cork or polyethylene foam. The buoyancy containers may be made with fiberglass, steel, aluminum, plastic, or another solid material. The number of buoyancy containers required for the aquatic substructure may be scaled based on the size of the column and/or the weight being supported by the column. For example, a large column may require five or six buoyancy containers, while a small column may only require two buoyancy containers.

In some embodiments, a beam may be connected to a buoyancy container and the column. Each buoyancy container may be connected to a solid length beam. The beams may be a rigid shaft, rod, pipe, or solid material such as concrete, steel, aluminum, plastic, fiberglass, or something substantially similar. The beams may be compressed by the force of the cables connecting the buoyancy containers to the column. A beam may be attached to a buoyancy container and column using a universal joint, as indicated by a dot in the figure. In some embodiments, the beams may be comprised of several smaller beams connected to make a support structure. The orientation of the cables connecting the outer joint (i.e., the joint at the distal end of the beam) to the column may result in the beam carrying the bending load of the aquatic sub structure.

In some embodiments, each beam may have a joint at both terminal ends of its length. The joints may be a universal joint, ball joints, or another joint which relieves moment transfer, or any combination thereof (i.e., the two joints need not be the same type of joint). The joints may allow 360° rotation in the x-y plane. The joints may allow the buoyancy containers to rotate and to relieve the bending loads on the beam. The joints may allow for a moment free connection between the buoyancy containers and the beams.

In some embodiments, each beam may have a joint only at the terminal end opposite from the column (i.e., the distal end). That is, in some embodiments, the beam may be connected to the buoyancy container by means of a joint and may be connected to the column by another connection mechanism such as welding.

In some embodiments, the substructure may have a ballast. The ballast may be a solid block or a hollow container capable of retaining water or another dense material. The ballast may be made of concrete, asphalt, or may be made of a plastic, steel, aluminum, or fiberglass shell which may be filled with water. The ballast may be lowered using a ballast lowering chain. The ballast lowering chain may be a metal chain, fiber rope, plastic cable, or another other connecting device. The ballast may be raised to allow the structure to be moved or may be lowered to stabilize the substructure. When the ballast is lowered the substructure may have a lower center of gravity and may remain substantially upright.

In some embodiments, the mooring chains may attach the substructure directly to the sea floor. In other embodiments, the mooring chains may attach the substructure to a moor, dock, or other substructures. In some embodiments, the mooring chains may be made of substantiality similar material to the support cables. In other embodiments, the mooring chains may be made of a different material from the support cables. The mooring chains may be made of metal chain links, fiber, or other rope-like materials.

Figure 5:
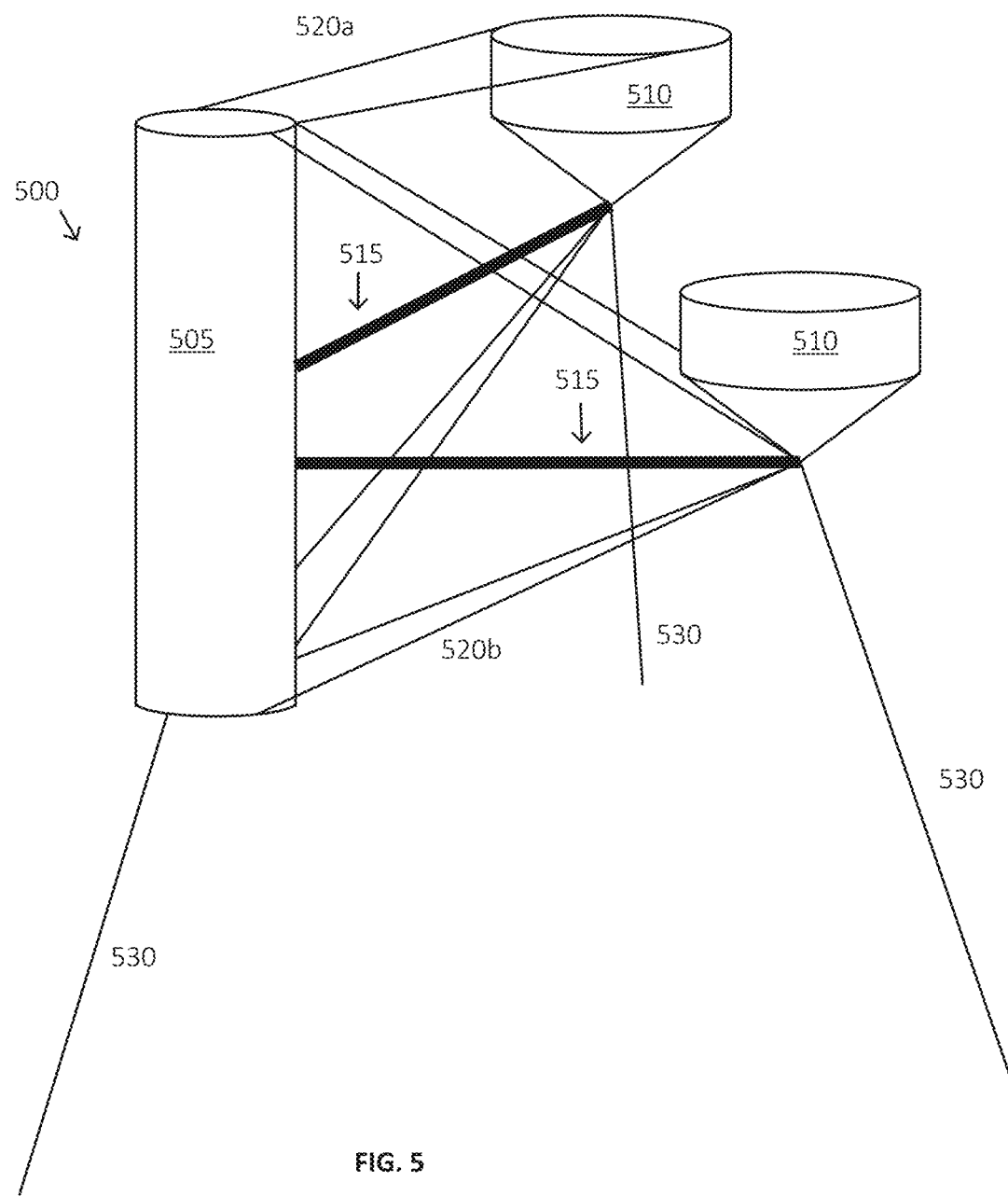
FIG. 5 illustrates another embodiment of an aquatic substructure as described in some embodiments of the present disclosure.

FIG. 5 illustrates another embodiment of an aquatic substructure as described in some embodiments of the present disclosure. In some embodiments, as shown in FIG. 5, the aquatic substructure 500 may include a column, 505, buoyancy containers 510, beams 515, upper cables 520a, lower cables 520b, and mooring chains 530. As shown in the example of FIG. 5, the column 505 may not be centered between the buoyancy containers 510 but the aquatic substructure 500 may be in a V-shape with the column 505 connecting two buoyancy containers 510. The angle between the two buoyancy containers 510 may be less than 90°. In some embodiments, the angle between the two buoyancy containers may be greater than 90°. In this embodiment, cables 520 may connect a joint (not shown in this figure) to the column 505. The joint may be located at the distal end of the beam (i.e., the terminal end of the beam farthest from the column). The buoyancy containers 510 may be connected to the joints. In some embodiments, the beams 515 may be connected to the column 505 by means of a shackle, ring, or another device which may be embedded or welded to the column (not shown).

Figure 6:
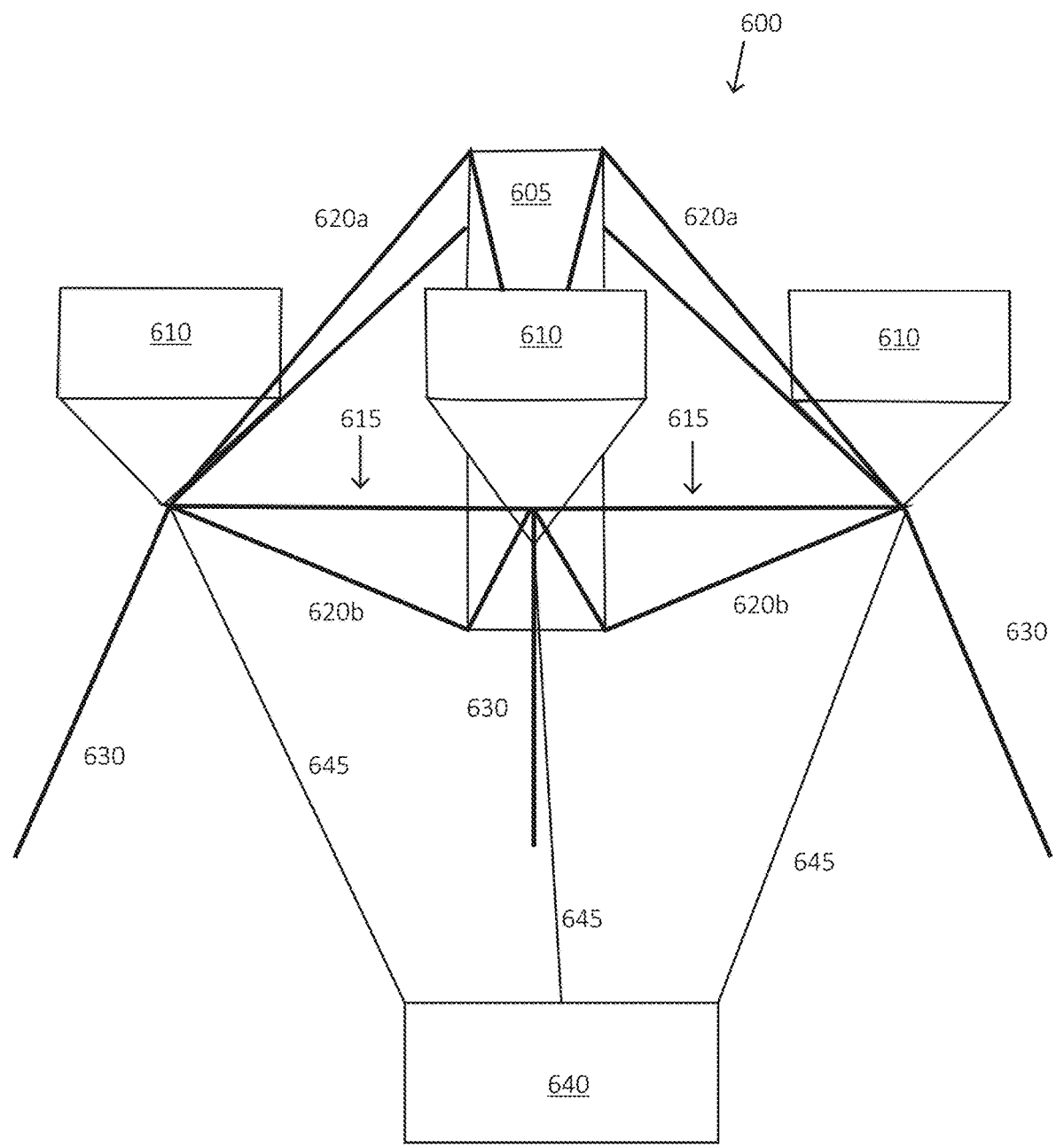
FIG. 6 illustrates another embodiment of an aquatic substructure as described in some embodiments of the present disclosure.

FIG. 6 illustrates another embodiment of an aquatic substructure as described in some embodiments of the present disclosure. The aquatic substructure 600, as shown in FIG. 6 may include a column 605, buoyancy containers 610, beams 615, upper cables 620a, lower cables 620b, mooring chains 630, ballast lowering chains 645, and a ballast 640. In some embodiments, as shown in FIG. 6, the aquatic substructure 600, may have a column 605, which may be attached to three buoyancy containers 610. Mooring lines 630 may connect the buoyancy containers 610 and column 605 to the ocean floor, an anchor, or another aquatic substructure. Each buoyancy container 610 may be connected to a single mooring line 630, or multiple mooring lines 630 may be connected to each buoyancy container 610. Additionally, the aquatic substructure 600 may have a single mooring line connecting either the column 605 or a single buoyancy container 610 to something to the ocean floor, an anchor, a moor, or another aquatic substructure.

As shown in FIG. 6, the column 605 may be connected to the buoyancy container 610 by a system of cables and beams. The connection mechanism of the joints connected to the beams and columns are shown in more detail in FIG. 7. The support cables 620 may connect the joint at the distal end of the beam (i.e., the end of the beam closest to the buoyancy container and farthest from the column) to the column. The cables may connect with both ends of the column, or a single end. That is, the upper cables 620a may connect with the upper end of the column 605 and the lower cables 620b may connect with the lower end of the column 605 or only one type of cable may connect to one end of the column 605. For the upper support cables there may be two cables connecting the joint at the distal end of the beam to the column, or there may be a single cable which wraps around the column then returns to the joint at the distal end of the beam. For the lower support cables there may be two cables connecting the joint at the distal end of the beam to the column, or there may be a single cable which wraps around the column then returns to the join at the distal end of the column. The cables may connect to the joint and the central column using a shackle, a ring, or a device embedded or welded to the joint and/or central column. The cables may each contain a turnbuckle to allow the cables to be tightened or loosened as needed. The upper support cables 620a may connect the buoyancy containers 610 to the top or upper end of the column. The lower support cables 620b may connect the buoyancy containers 610 to the bottom or lower end of the column. Some embodiments may have either upper support cables 620a or lower support cables 620b only, although both is preferred.

Figure 7:
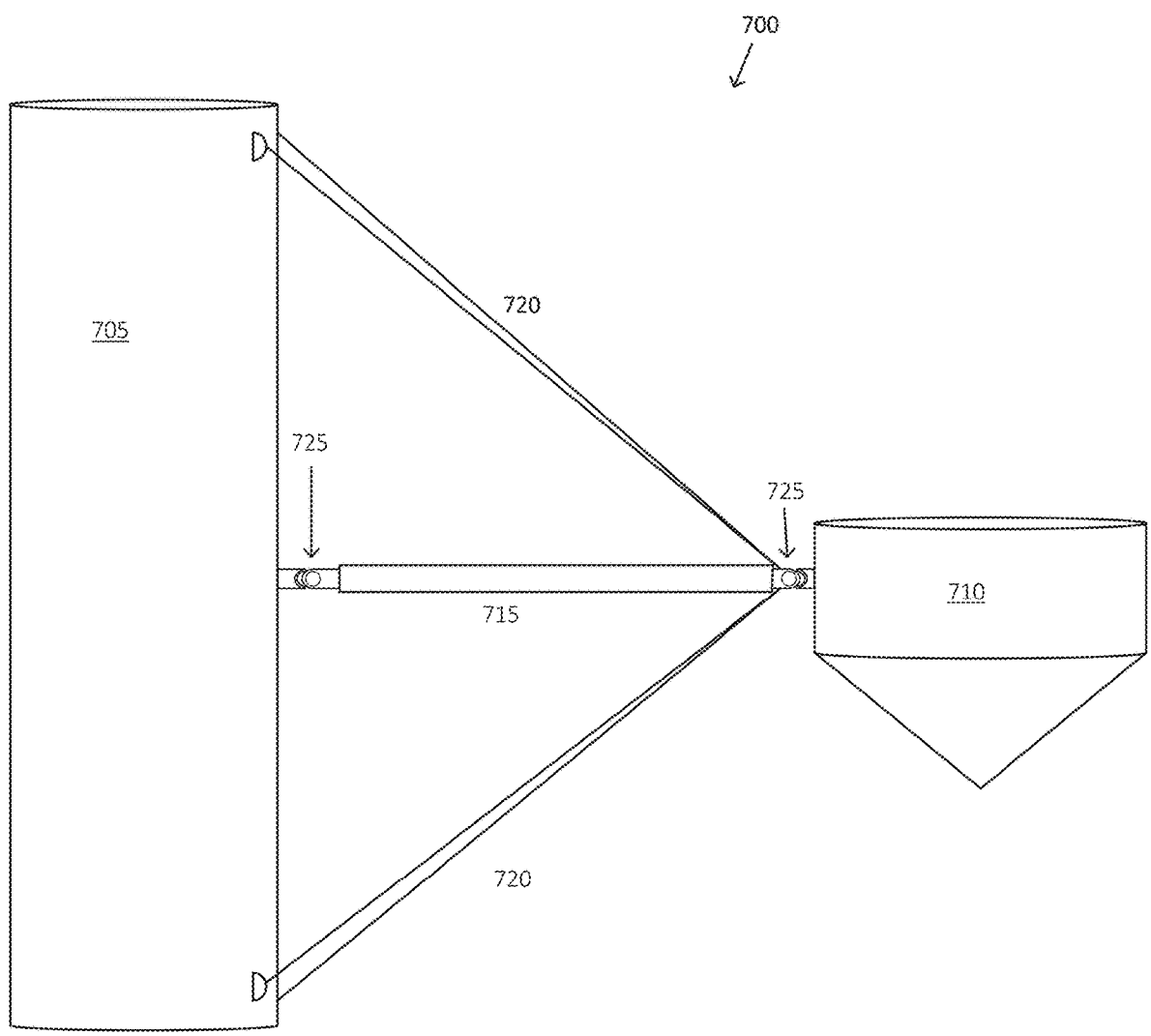
FIG. 7 illustrates a column, buoyancy container, and connection system of an aquatic substructure as described in some embodiments of the present disclosure.

FIG. 7 illustrates a column, buoyancy container, and connection system of an aquatic substructure as described in some embodiments of the present disclosure. The connection system of an aquatic substructure 700 as shown in FIG. 7 includes a column 705, cables 720, joints 725, a beam 715, and a buoyancy container 710. FIG. 7 shows how the buoyancy containers may be connected to the column in some embodiments. As shown in FIG. 7, the beam 715 may be compressed by the tension of cables 720. The cables 720 may attach to the joint 725 at the end of beam 715 and provide such a force as to compress the beam 715. Joint 725 may allow buoyancy container 710 to move independently. Joints 725 may be a universal joint, ball joint, pin joint, or other joint which allows buoyancy container 710 to move independently of the beam 715. The tension of the cables 720 may keep the beam 715 compressed, while the range of motion allowed by the joint 725 may allow the buoyancy containers 710 to move and rotate independently of the rest of the aquatic substructure. As shown herein, the column 705, beam 715, joints 725, cables 725, and buoyancy container 710 may be substantially the same as column 605, beams 615, joints 625, and buoyancy containers 610 as described with respect to FIG. 6.

The foregoing disclosure includes various examples set forth merely as illustration. The disclosed examples are not intended to be limiting. Modifications incorporating the spirit and substance of the described examples may occur to persons skilled in the art. These and other examples are within the scope of this disclosure and the following claims.

What is claimed is:

1. A method comprising:
   connecting a beam to a column at a substantially right angle using a first joint;
   connecting the beam to a buoyancy container using a second joint; and
   connecting a first cable and a second cable to the second joint and the column, wherein:
      the column has a first end, a second end, and a length,
      the first cable connects the second joint to the first end of the column,
      the second cable connects the second joint to the second end of the column,
      the third end of the beam is connected to the length of the column,
      the first cable and the second cable are under tension, and
      the first joint and the second joint are universal joints, ball joints, or spherical rolling joints.

2. The method of claim 1 further comprising anchoring the aquatic subsystem in place using mooring chains attached to at least one of the column or the first container.

3. The method of claim 1 further comprising lowering a ballast attached to at least one of the column or the first container.

4. The method of claim 1 further comprising raising a ballast attached to at least one of the column or the first container to allow the aquatic substructure to be moved by means of a wet tow.

5. A device comprising:
   a column having a first end, a second end, and a length;
   a buoyancy container;
   a beam having a third end and a fourth end that is at an approximately right angle to the column;
   a first joint that connects the third end of the beam to the length of the column;
   a second joint that connects the fourth end of the beam to the buoyancy container;
   a first cable that is attached to the second joint and the first end of the column and under tension; and
   a second cable that is attached to the second joint and the second end of the column and under tension;
   wherein:
   the first joint and the second joint are universal joints, ball joints, or spherical rolling joints.

6. The aquatic substructure device of claim 5 further comprising:
   a ballast that is connected to at least one of the column or the buoyancy container;
   a chain that connects the ballast to at least one of the column or the buoyancy container; and
   a mooring line that connects at least one of the column or the buoyancy container to the ocean floor.

7. A device comprising:
   a column having a first end, a second end, and a length;
   a beam having a third end connected to the length of the central column and a fourth end;
   a buoyancy container connected to the fourth end of the beam by a first joint;
   a first cable that connects the first joint to the first end of the column and is under tension;
   a second cable that connects the first joint to the second end of the column and is under tension;
   the beam is oriented at an approximately right angle to the central column, and
   the first cable and the second cable comprise one length of cable.

8. The aquatic substructure of claim 7, wherein the third end of the beam is connected to the length of the central column by a second joint.

* * * * *